(12) United States Patent
Gill

(10) Patent No.: US 6,947,951 B1
(45) Date of Patent: Sep. 20, 2005

(54) SYSTEM FOR MODELING A BUSINESS

(76) Inventor: Harjinder S. Gill, 5716 Continental Dr., Edina, MN (US) 55436

( * ) Notice: Subject to any disclaimer, the term of this patent is extended or adjusted under 35 U.S.C. 154(b) by 550 days.

(21) Appl. No.: 09/545,531

(22) Filed: Apr. 7, 2000

(51) Int. Cl.[7] ............................. G06F 7/00; G06F 17/00
(52) U.S. Cl. ....................................... 707/104.1; 705/7
(58) Field of Search ........................... 705/7; 707/104.1

(56) References Cited

U.S. PATENT DOCUMENTS

| | | | | |
|---|---|---|---|---|
| 4,613,946 A | * | 9/1986 | Forman ...................... | 345/841 |
| 5,644,740 A | * | 7/1997 | Kiuchi ....................... | 345/853 |
| 5,745,113 A | * | 4/1998 | Jordan et al. ................ | 345/440 |
| 5,978,811 A | * | 11/1999 | Smiley .......................... | 705/1 |
| 6,072,493 A | * | 6/2000 | Driskell et al. ............. | 345/804 |
| 6,171,109 B1 | * | 1/2001 | Ohsuga ....................... | 434/118 |
| 6,233,537 B1 | * | 5/2001 | Gryphon et al. ............... | 703/1 |
| 6,275,848 B1 | * | 8/2001 | Arnold ........................ | 709/206 |
| 6,278,977 B1 | * | 8/2001 | Agrawal et al. ................ | 705/7 |
| 6,341,290 B1 | * | 1/2002 | Lombardo et al. ............ | 707/10 |
| 6,347,303 B2 | * | 2/2002 | Nagai et al. .................. | 705/10 |

FOREIGN PATENT DOCUMENTS

WO      WO 01/38976    *  5/2001            G06F/9/44

* cited by examiner

*Primary Examiner*—Tariq R. Hafiz
*Assistant Examiner*—Andre Boyce
(74) *Attorney, Agent, or Firm*—Schwegman, Lundberg, Woessner & Kluth, P.A.

(57) ABSTRACT

A data structure and software systems for modeling a business are disclosed. The data structure is formed of a constellation of data structures termed Business Execution and Analysis Models (BEAMs). Each of these BEAMs is formed of one or more hierarchies and/or dimensions that express a collection of business scenarios. Each hierarchy has a name and includes two or more levels. A lineage relationship exists between the levels in the hierarchy, wherein the hierarchy has a tree-like structure. One or more cross-link relationships may be provided between levels of two hierarchies, wherein each cross-link relationship defines a business rule or a business constraint. Each BEAM may include one or more dimensions which have one or more cross-link relationships between the hierarchies. One or more business perspectives may be provided, wherein the business perspective is a template of a multidimensional query into the data.

13 Claims, 9 Drawing Sheets

SYSTEM FOR MODELING A BUSINESS

TECHNICAL FIELD

The present invention relates generally to systems for use in operating a business, and more particularly to method, apparatus, systems and articles of manufacture useful in managing a business.

COPYRIGHT NOTICE—PERMISSION

A portion of the disclosure of this patent document contains material, which is subject to copyright protection. The copyright owner has no objection to the facsimile reproduction by anyone of the patent document or the patent disclosure as it appears in the Patent and Trademark Office patent files or records, but otherwise reserves all copyright rights whatsoever. The following notice applies to the software and data as described below and in the drawing attached hereto: Copyright© 1999, 2000, Entreon Corporation, All Rights Reserved.

BACKGROUND

A significant challenge facing all businesses is managing the constantly changing business environment. With the advent of the World Wide Web, the rate of change has accelerated dramatically when compared to what previously was considered a grueling pace. Changes to the businesses place enormous stress not only on employees, but also on the business' enterprise applications.

All organizations operate from a business model. This model is a defined set of organizational structures and interrelating business rules. It is also the go-to-market strategy for the business. Operational systems are driven from an understanding of this business model and when the rapid pace of change is considered along with the complexity of these systems, it becomes apparent that it is very difficult to keep operational systems current with the business' go-to-market strategy.

A significant outcome of Data Warehousing initiatives has been the consolidation of various islands of information in corporate IT environments. Transaction systems continue to produce large volumes of data and the proliferation of web Intranets has hastened the pace of data production. A deeper penetration of information systems within organizations has resulted in data encountering many processing cycles before it settles into a data warehouse. Similarly, an ever increasing numbers of user applications—report writers, OLAP and web tools—are mining the data in the data warehouse. In other words, although data warehouses are consolidating business intelligence information, the corporate data is flowing through a web of interfaces, i.e. information supply chain, that are longer, deeper and more complex than ever before.

Since data at every point of its life cycle is an outcome of a set of business rules and operations, a slight change in the business model impacts the meaning and validity of data at every point in the organization. This has a direct bearing on the rules coded in a data warehouse for extracting business intelligence information from raw data. The business model is typically only taken into account at the beginning of the project, the start of the information supply chain. Herein lies the problem of temporal distortion. Temporal distortion results from the inability of enterprise applications to keep pace with the ever-changing business environment. Each enterprise application, including data warehouses as cited in this example, maintain an independent view of the business model that is quickly invalidated by the rapid pace of business change. Furthermore, because enterprise applications are usually installed serially, they each maintain a different view of the business model. They are operating with different snapshots of the then-current business model.

Using the data warehouse as an example, the current view of information could be temporally distorted as compared to the historical views because of a changed business model. Additionally, organizations are often required to restate historical information (e.g. financial information) to comply with changing reporting requirements and/or discovery of new facts. Restating history is also a temporal distortion of data.

The net result is that the keepers of Data Warehouses are making compromised comparisons between historical views and the current view of data. Even if the information supply chain is to be brought into compliance with the revised business model, the process is cumbersome, time-consuming, and expensive with current technology and tools. The unfortunate result is that by the time such changes are instituted, the underlying business model could have changed again, thus rendering the just-completed effort obsolete. The only alternative, generally considered unacceptable to the business, is to stop changing the business. As alluded to above, the costs of conducting such changes are exorbitant. These costs can be a substantial percentage of the original cost of building and deploying the data warehouse, recurring annually.

Thus, there exists a need for improving data structures and related data handling systems for support of business operations.

SUMMARY

As described in more detail herein below, the present invention provides the ability to capture a business model, manage business model changes, maintain business model history, provide collaborative communications of current and retrospective business model views, and synchronize the business model within enterprise applications within the business being modeled. According to one embodiment of the invention, the business model can be quickly synchronized with a company's enterprise application infrastructure. According to another embodiment of the invention, there is maintained a corporate memory of business model changes due to corporate initiatives such as corporate reorganizations, sales force restructuring, product category re-definition, marketing promotion rollouts, mergers, acquisitions, and spin-offs. By maintaining such an audit trail, changes in the business can be automatically synchronized with business rules embedded in the information supply chain. This synchronization can be completed quickly and cost effectively, thereby eliminating temporal distortion—the integrity gap between the current view of the business model and the lagging views of the enterprise application infrastructure.

According to one example embodiment, the invention provides a data structure and related software systems for modeling a business. The business model data structure is formed of a constellation of data structures termed Business Execution and Analysis Models (BEAMs). Each of these BEAMs is formed of one or more hierarchies and/or dimensions used to express a collection of business scenarios or subject areas. Each hierarchy has a name and includes two or more levels. A lineage relationship exists between the levels in the hierarchy, wherein the hierarchy has a tree-like structure based on a one-to-many relationship. Each level has one or more members and each member contains identical types of data. One or more cross-link (Xlink) relationships may be provided between levels of two hierarchies, wherein each cross-link relationship defines a business rule or a business constraint. Each BEAM may include one or more dimensions formed by two hierarchies, which have one or more cross-link relationships between the hierarchies, wherein the cross-link relationship may represent a many-to-many relationship. One or more lists are provided wherein the members of a list have the same properties, and further wherein the members of the list may be ordered and incorporated in one or more hierarchies. In addition, one or more business perspectives are formed as a collection of two or more hierarchies and/or dimensions, and further wherein the business perspective is a template of a multidimensional query.

DETAILED DESCRIPTION

Figure 1:
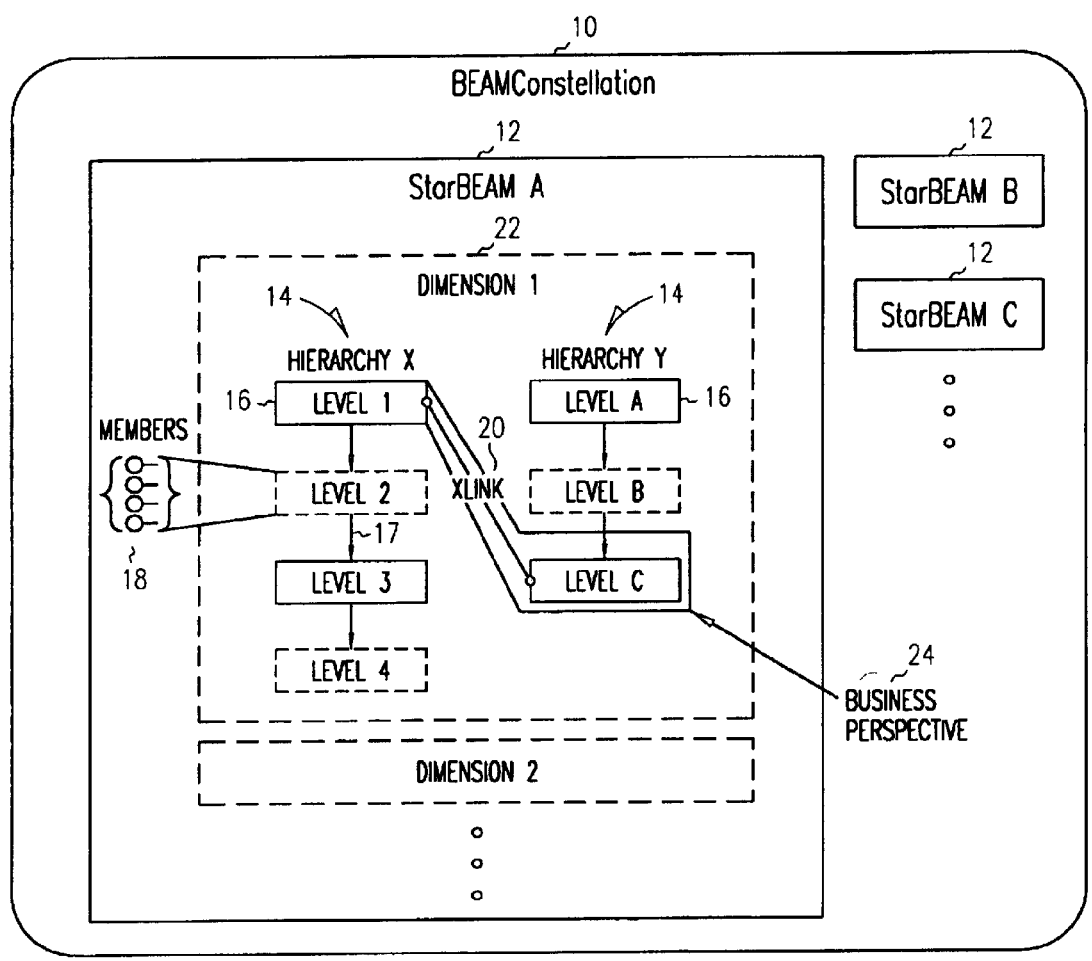
FIG. 1 illustrates a fragment of a data structure according to one aspect of the present invention.

In the following detailed description of the invention reference is made to the accompanying drawings which form a part hereof, and in which is shown, by way of illustration, specific embodiments in which the invention may be practiced. In the drawings, like numerals describe substantially similar components throughout the several views. These embodiments are described in sufficient detail to enable those skilled in the art to practice the invention. Other embodiments may be utilized and structural, logical, and electrical changes may be made without departing from the scope of the present invention.

Referring now to FIG. 1, there is illustrated a first embodiment a data structure for modeling a business according to one example embodiment of the invention. As illustrated, the business model data structure is formed of a constellation 10 of data structures termed Business Execution and Analysis Models (BEAMs). Each of these BEAMs 12, is formed of one or more hierarchies 14 and/or dimensions 22 used to express a collection of business scenarios or subject areas. Each hierarchy 14 has a name (X and Y in the example of FIG. 1) and includes two or more levels 16. A lineage relationship 17 exists between the levels in the hierarchy 14, wherein the hierarchy 14 has tree-like structure based on a one-to-many relationship. Each level has one or more members 18 and each member 18 contains identical types of data.

As also illustrated in FIG. 1, one or more cross-link (Xlink) relationships 20 may be provided between levels of two hierarchies, wherein each cross-link relationship defines a business rule or a business constraint. Each BEAM 12 may include one or more dimensions 22 formed by two hierarchies which have one or more cross-link relationships between the hierarchies, wherein the cross-link relationship 20 may represent a many-to-many relationship. One or more business perspectives 24 may be provided, wherein each business perspective 24 is a collection of two or more hierarchies 14 and/or dimensions 22, and further wherein the business perspective is a template of a multidimensional query into the data contained in the data structure.

According to this example embodiment, members of a level are defined using one or more lists wherein the members 18 of a list have the same properties, and further wherein the members 18 of the list may be ordered and applied as members 18 in hierarchies 14. Relationships 17 may be an association, business rule, dependency, or link between two members 18, at different levels 16, in the same hierarchy 14. Relationships 17 include Link Rules (single parent or multiple parents) as well as orphans, which are levels 16 without a parent. The present embodiment of the invention further provides a relationship value that is a property of the relationship that describes a business rule or business constraint, wherein the value may be expressed as a collection of or individually as a percentage, a constant or a formula.

According to one example embodiment of the invention, the data structures as outlined above are implemented using object oriented software, but the invention is in no way limited in this respect and other programming approaches may be used if desired.

The present embodiment further provides for a portal, which is a management role-based prioritization of access and navigation of information around the key business management structures, such as people, managers, products, customers, channels, and business initiatives like marketing promotions. It is the gateway to internal information (such as enterprise resource planning/human resources/manufacturing/logistics/etc.) through Intranets, and inter-application information exchanges; and to external information (trade publications/syndicated data/WWW sites like Yahoo) through direct Internet connection to URLs on the World Wide Web or inter-enterprise business exchanges.

Figure 2A:
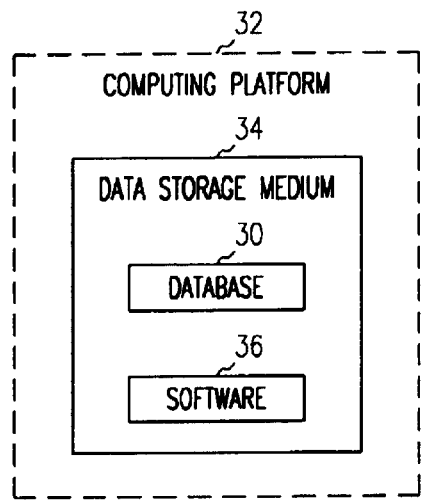
FIGS. 2A–2C illustrate a software system according to one aspect of the present invention.

Referring now to FIG. 2A, there is illustrated another embodiment of the invention. A database 30 is held in a data storage medium 34 of a computing platform 32, wherein database 30 is stored using the above-described data structures. Software system 36 is stored on data storage medium 34 and is operative on platform 32, which may be formed of any suitable computer system or combination of systems standing alone or networked together. Software system 36 includes code operative on the platform 32 to provide for navigating through the data structures, for example between levels of a hierarchy or around dimensions using the business relationship rules. Software system 36 is further operative to provide for viewing relationships between dimensions graphically using the defined relationships. Software system 36 further provides for performing a roll up or drill down operation using the relationships defined between dimensions.

Software 36 further includes code for performing the following acts:

1. linking a member to a parent with a relationship value (percentages/fixed etc . . . );

2. moving and linking member to member at same level as current parent;

3. moving and linking a member to skip a level;

4. linking a member to multiple parents with relationship value;

5. combining members at the same level;

6. splitting members and creating new members at the same and different levels;

7. inserting or removing a level;

8. keeping a history of changes—attribute versioning of member properties; and 9. managing orphans.

Figure 2B:
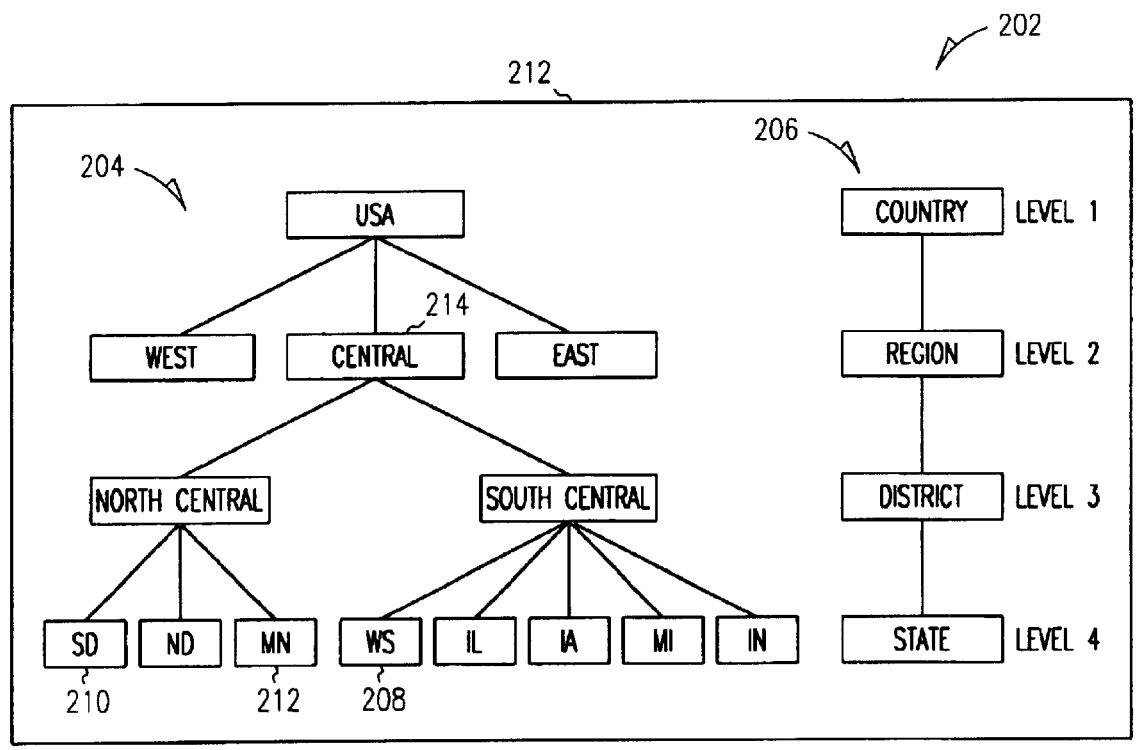

The operation of these acts is illustrated with respect to an example of a Sales Territory hierarchy 200 as illustrated in FIG. 2B.

Link Member to a Single Parent or Multiple Parents. The relationship value is based on percentage allocation, fixed allocation, or some allocation formula. For example, in allocating operational expenditures across departments in a Corporate Organization hierarchy a combination of value allocations can be used. For instance, 15% of total Corporate Allocation can be to the Marketing Department but with an allocation cap of $100K per quarter.

Move a Member and Link to a Member at Same Level as Current Parent. For example, in the Sales Territory hierarchy 200, the state of MN 202 may be moved from the North Central District 204 to the South Central District 206. The history of the level will move with it. Optionally, history or its copy can be kept with the current parent district, i.e. the North Central District 204.

Split Members and Create New Members at the Same or different Levels. For example, the South Central District 206 can be split to form a new Member Mini Central (not shown) at the same Level 3. Similarly, the North Central District 204 can be split such that the state of MN 202 along with the state of WS 208 (from the South Central District 206) to form the Mini Central. Also, the state of SD 210 from the North Central District 204 can report directly to USA 212 by creating virtual members (not shown) at Levels 3 and 2. As before, history can be moved with members or kept with the original parent.

Insert or Remove a Level. For example, a new Level (not shown) for Area can be introduced between Region and District. Correspondingly, NC Area and SC Area members (not shown) are introduced under the Central Region District 214 such that the North Central District 204 reports into NC Area and the South Central District 206 reports into SC Area. This requires adjustment of parentage level number for all state members (which are at Level 5 now). The rules for moving or keeping history with members apply as before. Similarly, if a level is removed from the hierarchy 200 then child members need to be reassigned to the original grandparent member.

Attribute Versioning. Optionally, all changes to non-key attributes of member records in the database can be recorded under an older version of that member record. For example, if a distribution center and sales team in the state of SD 210 is disbanded then the status of that member record in the database can be changed to "Inactive." However, sales history for the state of SD 210 is still maintained in the database for dates prior to the change to "Inactive."

Maintain Orphan Members. For example, when a business gets acquired, the acquired business may not have the notion of a Sales Region in their Sales Territory hierarchy. Therefore, in order to integrate the sales territories of two companies, the acquired Sales Territory hierarchy could be moved under existing sales region in the Sales Territory hierarchy of the acquirer. Or, a virtual region member can be defined and the acquired Sales Territory hierarchy can be placed under the virtual region.

Figure 2C:
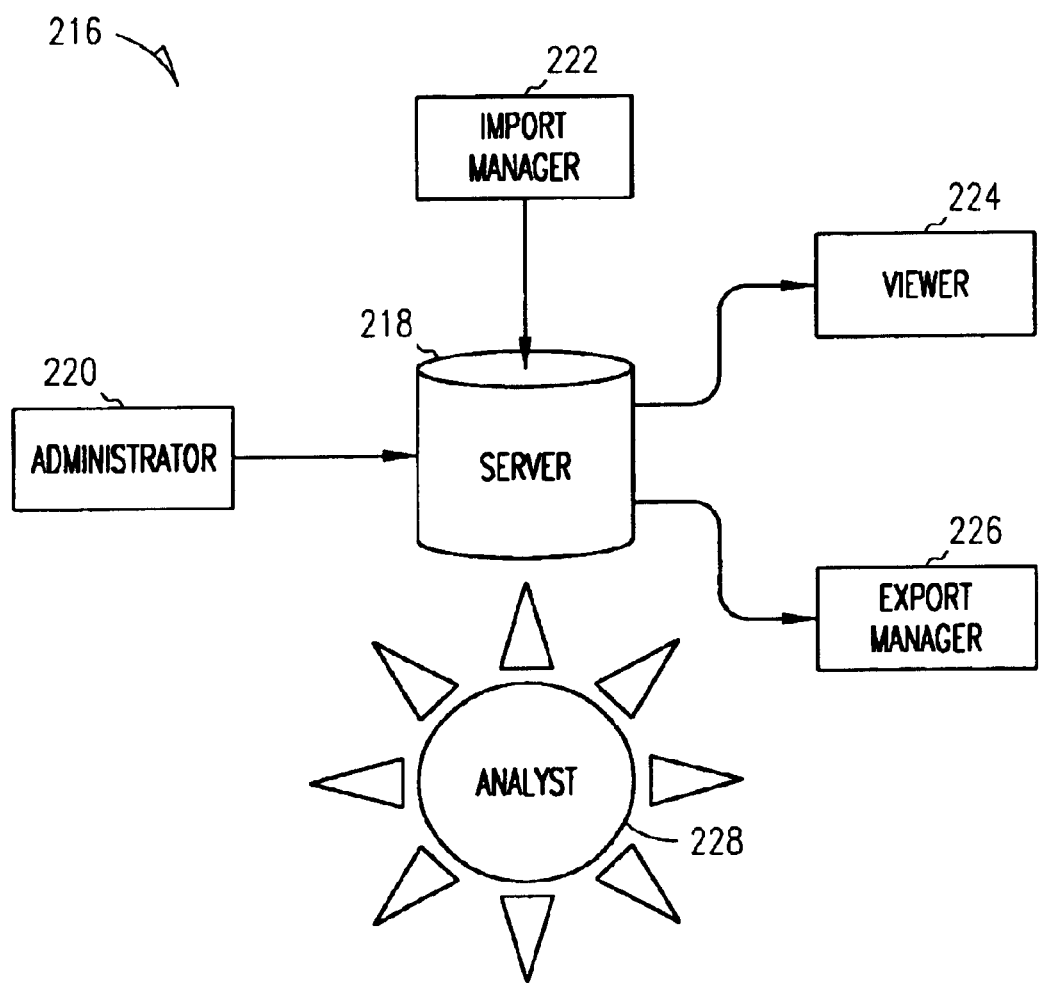

FIG. 2C illustrates a system according to one aspect of the present invention. A system 216 provides solutions to various business challenges, such as maintenance of a warehouse hierarchy, generation of executive portal content, modeling a business, and planning a business organization. The system 216 includes an administrator 220. The administrator 220 provides four functions to the system 216. First, the administrator 220 allows a definition of a business model and allows such a business model to be populated with members. The administrator 220 maintains system lists (which include persons, roles, and teams), custom lists, levels and hierarchies, dimensions and business rules, and business perspectives, as well as collections of one or more hierarchies and/or dimensions. Second, the administrator 220 administers change management and version management for the system 216. Third, the administrator 220 allows viewing, navigation, import, and export of various data contained in the system 216, such as system lists, custom lists, levels, hierarchies, dimensions, business rules, business perspectives, and collections of one or more hierarchies and/or dimensions. Fourth, the administrator 220 allows general management of system 216 to manage users, system parameters, and production.

The system 216 includes a server 218. The server 218 provides four functions to the system 216. First, the server 218 manages the business model and members contained in the business model. The server 218 relates various information, such as system lists (which include persons, roles, and teams), custom lists, levels and hierarchies, dimensions and business rules, and business perspectives, as well as collections of one or more hierarchies and/or dimensions. Second, the server 218 supports the administrator 220 in change management and version management for the system 216. Third, the server 218 assists the viewing, navigation, import, and export of various data contained in the system 216, such as system lists, custom lists, levels, hierarchies, dimensions, business rules, business perspectives, and collections of one or more hierarchies and/or dimensions. Fourth, the server 218 models objects and provides database management.

The system 216 includes a viewer 224. The viewer 224 provides three functions to the system 216. First, the viewer 224 allows viewing in hyperbolic space. Information that can be viewed using the viewer 224 includes hierarchies, dimensions (as a denormalized hierarchy), business perspectives (as a denormalized hierarchy), and collections of one or more hierarchies and/or dimensions (as collections of denormalized hierarchies). Second, the viewer 224 allows navigation in hyperbolic space. Information that can be navigated includes hierarchies, dimensions, business perspectives, and collections of one or more hierarchies and/or dimensions. Third, the viewer 224 allows exporting various information, such as hierarchies, dimensions, business perspectives, and collections of one or more hierarchies and/or dimensions.

The system 216 includes an analyst 228. The analyst 228 provides four functions to the system 216. First, the analyst 228 provides an interface for business users and business analysts. The analyst 228 allows business users and business analysts to populate the system 216 with members in locations, such as system lists (which include persons, roles, and teams), custom lists, levels and hierarchies, dimensions and business rules, and business perspectives, as well as collections of one or more hierarchies and/or dimensions. Second, the analyst 228 supports change management and version management for the system 216. Third, the analyst 228 allows viewing and navigation of members contained in various locations, such as system lists, custom lists, levels, hierarchies, dimensions, business rules, business perspectives, and collections of one or more hierarchies and/or dimensions. Fourth, the analyst 228 also allows an import or export of various data contained in the system 216, such as hierarchies, dimensions, business rules, business perspectives, and collections of one or more hierarchies and/or dimensions.

The system 216 includes an import manager 222. The import manager 222 provides two functions for the system 216. First, the import manager 222 supports import of a range of objects into the system 216. These objects include system lists, custom lists, hierarchies, and dimensions' Xlinks. The system lists include persons, roles, and teams. Second, the import manager 222 provides standard import formats.

The system 216 includes an export manager 226. The export manager 226 provides four functions for the system 216. First, the export manager 226 supports the export of a range of objects into the system 216. These objects include system lists, custom lists, hierarchies, dimensions' Xlinks, business perspectives, and collections of one or more hierarchies and/or dimensions. The system lists include persons, roles, and teams. Second, the export manager 226 provides standard export formats. Third, the export manager 226 allows an export to BI tools in various formats, such as binary pair format and full parentage format. Fourth, the export manager 226 allows an export to the viewer 224.

The system 216 includes many objects to provide solutions to various business challenges, such as maintenance of a warehouse hierarchy, generation of executive portal content, modeling a business, and planning a business organization. These objects include dimension objects, hierarchy objects, Xlink objects, level objects, list objects, and StarBEAM objects, which are collections of one or more hierarchies and/or dimensions. The list objects include system objects and user-definable objects. The system objects include person objects, role objects, and team objects.

The system 216 includes additional objects that are a collection of other objects, such as member objects and system list objects. Member objects populate hierarchy objects, dimension objects, and list objects. System list objects include person objects, team objects, and role objects.

The system 216 includes relationship objects. Relationship objects define relationship types, parentage business rules, and relationship values business rules. Relationship types include lineage, which is a parent-child relationship within a hierarchy, and Xlink, which is a relationship between levels in different hierarchies. Parentage business rules include single and multiple rules. Relationship values business rules include absolute value, percentage, and formula. The relationship objects can be orphan objects. The relationship objects also define various methods, such as methods for skipping parents, grandparents, and levels; methods for inserting a level into a populated hierarchy; and methods for removing a level.

EXAMPLE 1

Figure 3:
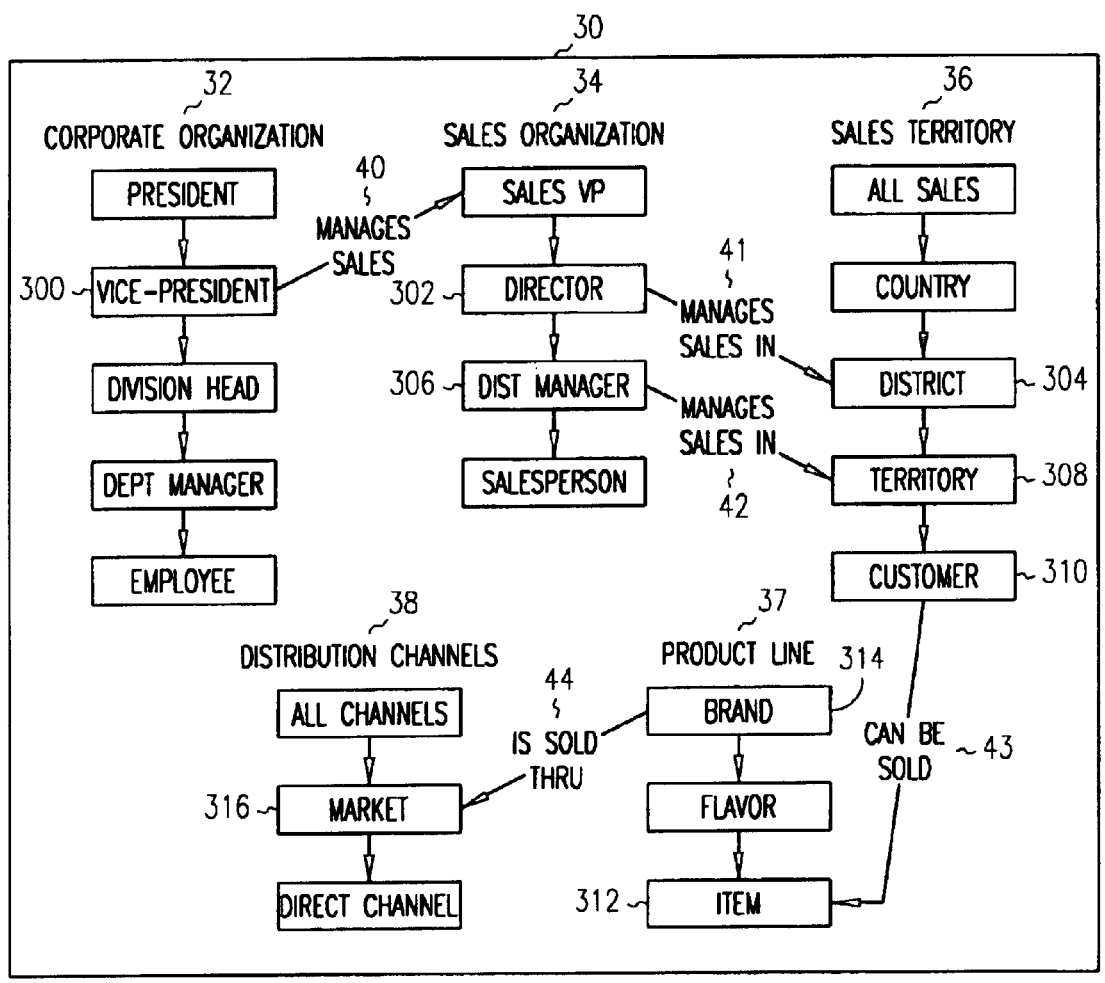
FIG. 3 illustrates a fragment of a data structure and use thereof according to one aspect of the present invention.

Referring now to FIG. 3, there is illustrated a first example data structure and use thereof according to the present invention. In this example, a fictitious company is considered—Natures's Best Cookies (NB), a specialty cookie manufacturer with worldwide sales. Nature's Best's products are organized by product line: wholesale, retail, and specialty. Products are distributed domestically and internationally through distribution channels. The domestic distribution channel is a direct sales force. A chain of international distributors represents the international distribution channel. Domestically, a sales force of twenty sales representatives is organized by geographic sales territory. The individual sales representatives manage products sales for each product within a specified sales territory.

FIG. 3 illustrates the NB business data model 30. There are five hierarchies—Corporate Organization 32, Sales Organization 34, Sales Territory 36, Product Line 37, and Distribution Channels 38. Five Xlinks 40–44 along with the related levels and hierarchies define five dimensions—Vice President 300 (a role) Manages Sales Organization 34, Director of Sales 302 Manages Sales in a District 304, District Manager 306 Manages Sales in a Territory 308, Customer 310 is Sold Items 312 from a Product Line 37, A Product Line Brand 314 is Sold Through a Market Distribution Channel 316.

EXAMPLE 2

Figure 4:
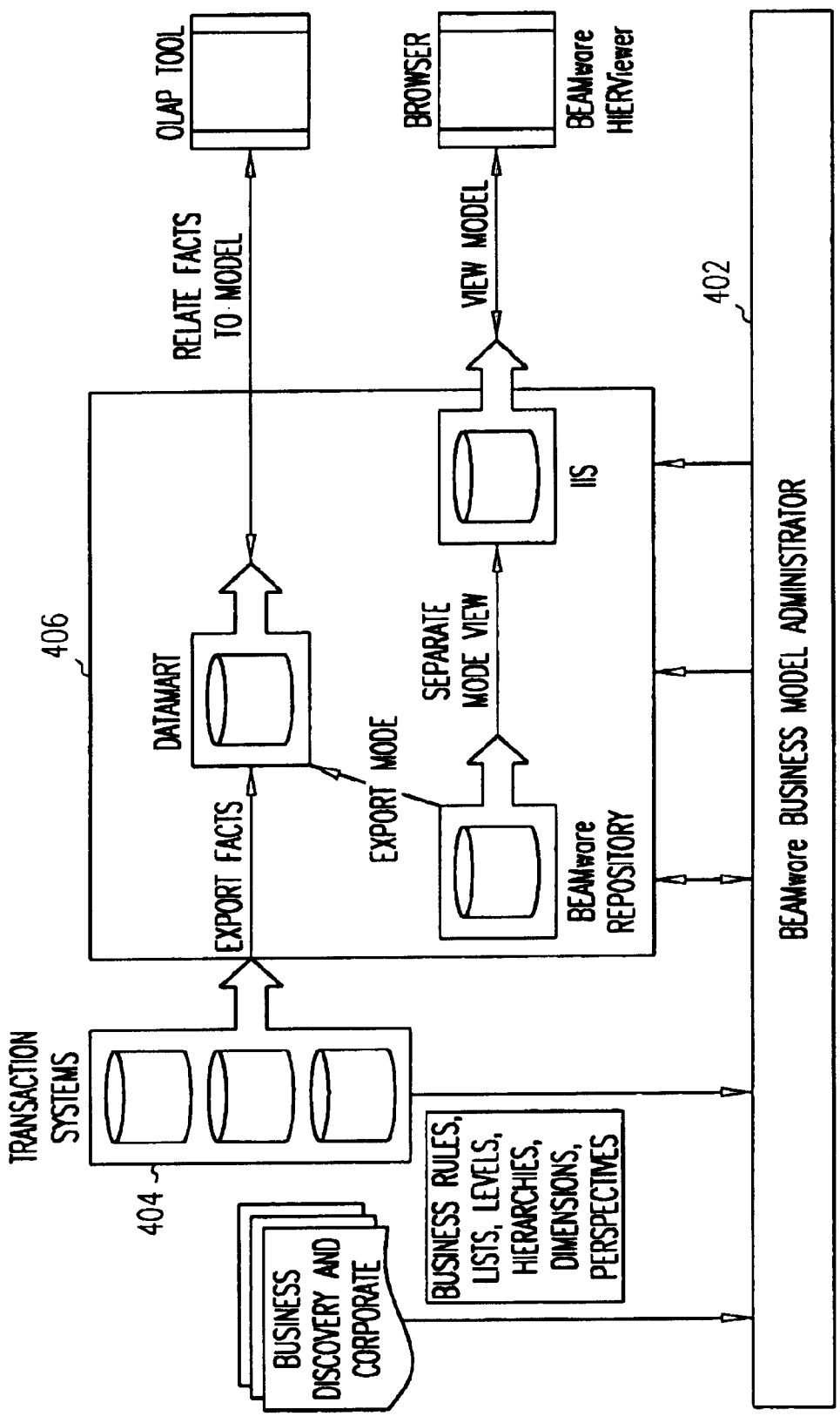
FIG. 4 illustrates an application of the software and data model according to one aspect of the present invention.

FIG. 4 illustrates the application of the software and data model of the present invention to the development of a business model. Using the data modeling software, the following acts are taken to define a business model:

a) Define Base Items. This includes defining system lists for people, teams, roles, products etc.

b) Define Levels within a type of list, e.g. levels of an organization c) Define Hierarchies, i.e. order of levels. Examples include corporate organization, product line etc.

d) Define Dimensions, i.e. business rules defining relationships across hierarchies. For example, "Corporate Sales by Organization" spans the relationship "Vice President Manages Sales Organization"

e) Define Business Perspectives, i.e. a multi-dimensional combination of hierarchies. For example, "Corporate Sales by Organization by District" spans The relationships "Vice President of Sales Manages Sales Director, who Manages sales District"

f) Define BEAMS, i.e. a collection of one or more hierarchies and dimensions to represent a subject area (e.g. data mart)

An Administrator application 402 is used for defining and importing the model definitions in a system data repository. In one example embodiment, several sources of information, such as corporate documents and business rules within corporate transaction/analytical systems, are explored to develop the business model.

Figure 5:
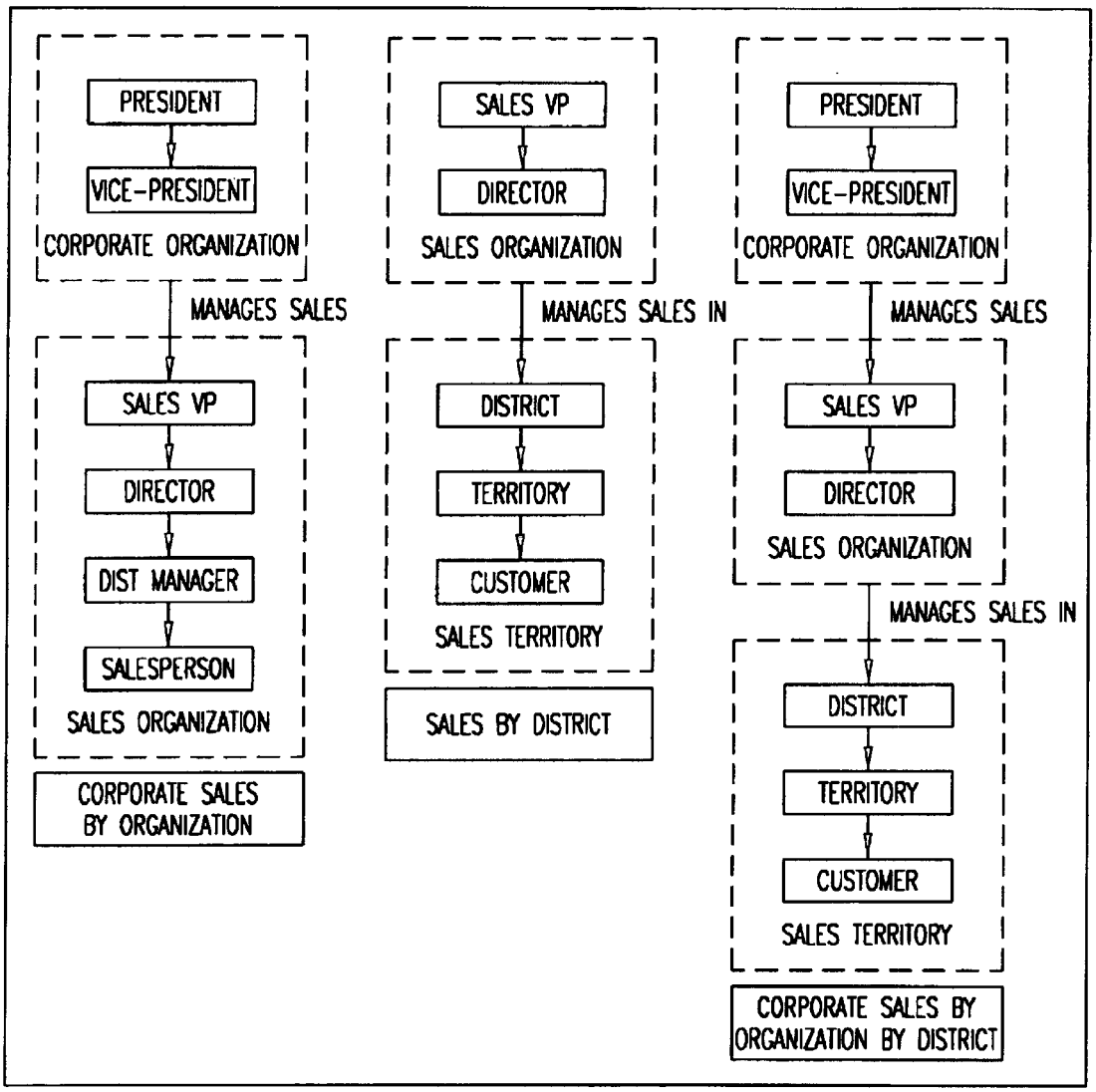
FIG. 5 illustrates some analytical views exported by a system according to one aspect of the present invention.

Besides defining and populating the business model, the Administrator application 402 helps with change and version management of the business model objects. The administrator application of software system 36 also defines various system parameters and user security for model management. Lastly, the Administrator application 402 imports system lists and business rules as well as exports business models to Datamart repositories and other external applications. FIG. 5 illustrates some of the analytical views exported by the system 404 to a Datamart 406.

According to one example embodiment, the business model can also be exported for viewing over the Internet via a hyperbolic sphere Java applet. Preferably, the viewer allows the user to view a large portion of the hierarchical business model around a spherical visual control. This enables easy navigation through the business model hierarchies. Dimensions and Business Perspectives can be viewed as de-normalized hierarchies in hyperbolic sphere.

The software system 36 of the present invention also provides in another example embodiment an Import Manager application that supports the import of system lists, custom lists, hierarchies and dimension Xlinks. Similarly, an Export Manager can export system lists, custom lists, hierarchies, dimensions, business perspectives and StarBEAMs in a standard format. Export Manager also exports data to the hyperbolic sphere Java applet viewer.

According to one example embodiment of the invention, the underlying principles of the business modeling techniques are based on the Universal Modeling Language (UML) standard. Further, the software system 36, according to another example embodiment, uses industry standard JDBC drivers for database connectivity. The software system 36 accordingly can work a variety of relational databases, such as DB2, Informix, Oracle, SQL Server, Sybase, and Teradata. According to yet another example embodiment, the software system 36 is coded in 100% Java, which provides cross platform compatibility. The server-side code is based on servelet technology. The client-side code is either a 100% Java application or Java applet running in a web browser thin-client (the viewer).

EXAMPLE 3

With the business model for Nature's Best Cookies defined as illustrated in FIG. 3, there will be given an example of a chronology of changing business needs and apply the business data model of the present invention to accommodate these changes in Nature's Best Cookies information resources.

New Business Need Example A: Rapid Growth and Reorganization

In light of rapidly growing business in the United States, Sales Management at Nature's Best Cookies feels that it can increase sales productivity by reorganizing sales territories as well as the sales organization. The following changes are implemented:

a) A new management level is added in the Sales Territory structure providing a focus on key sales regions.

b) Directors are promoted to manage Regions in addition to Districts in a Region.

c) Some of the Territories are reassigned to different Districts to optimize sales throughput geographically.

d) Similarly, some Customers are reassigned to different Territories to optimize customer care across geographies.

Figure 6:
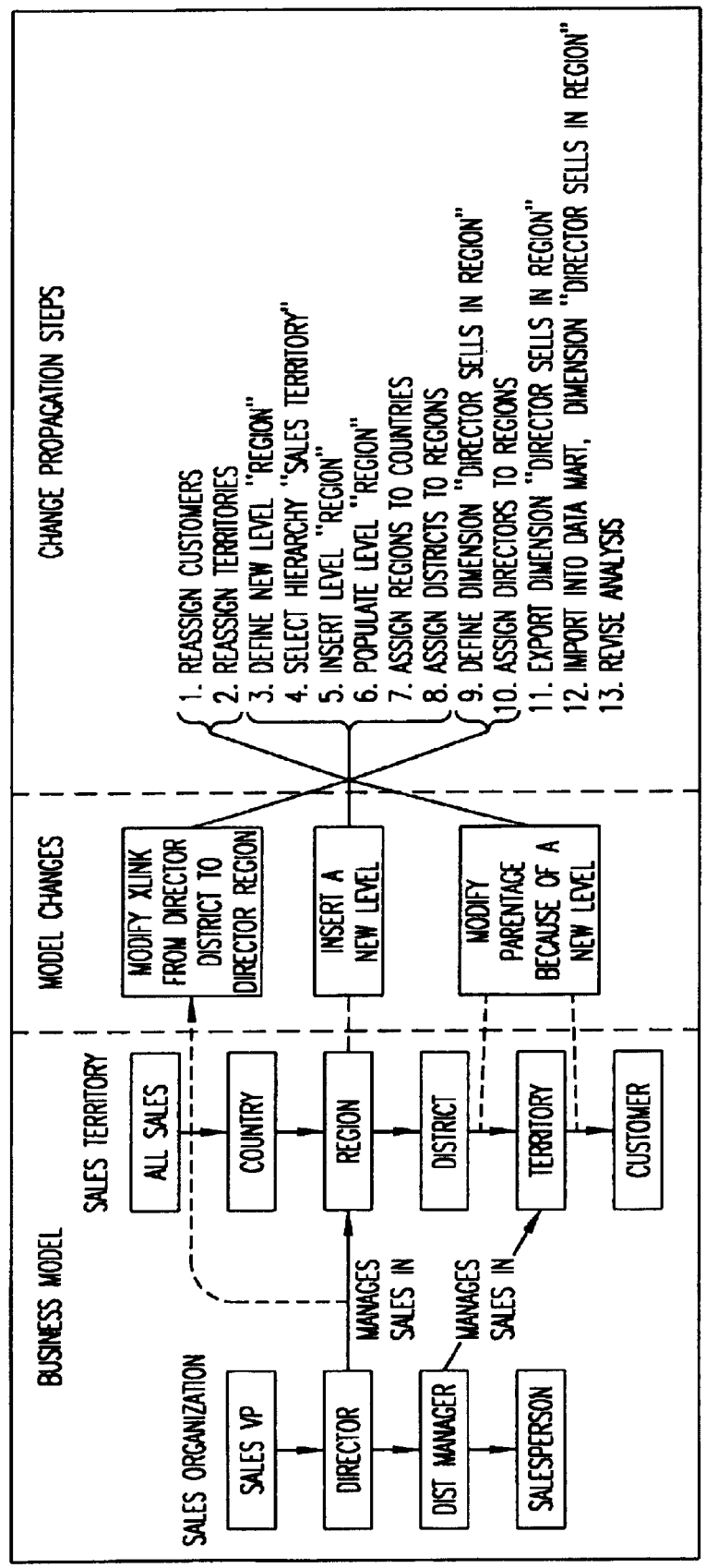
FIG. 6 illustrates a fragment of a hierarchy and a process according to one aspect of the present invention.

Once the reorganization is complete, the following changes are implemented to the business data model, as illustrated in FIG. 6:

a) Modify Hierarchies. Territories are moved around; Customers are reassigned; a new level for "Region" is inserted between Country and District in the Sales Territory hierarchy.

b) Modify Dimensions. A new dimension is added—Director (in Sales Organization) sells in Region (in Sales Territory).

c) Export to viewer. The revised business model is exported for review and validation to the hyperbolic viewer.

d) Export to Data mart. Hierarchies, Dimensions and Business Perspectives are exported to the existing data warehouse where the revised business model is applied to existing Facts. This makes the integrity of the business analytics in the data warehouse consistent with the new business reality, while maintaining a version of the old business reality.

New Business Need B: Brick-and-Mortar to Click-and-Mortar

The Board of Directors at Nature's Best Cookies decides to embark on an online business strategy with the intent of improving the company valuation. By analyzing the performance of various dimensions of the business, it is determined that the current distribution channels are strong. There is only one exception, in that, some of the low margin items (Margin below $0.90) are not profitable to sell through the direct sales channel. The overhead of sales expenses reduces the margin for such items. In order to avoid a conflict between the direct sales channel and a newly proposed online channel, it is decided that all brands will continue to be sold through all markets, except certain low margin items, such as ice-cream candy. These low-margin items are earmarked for sale through the online store.

Figure 7:
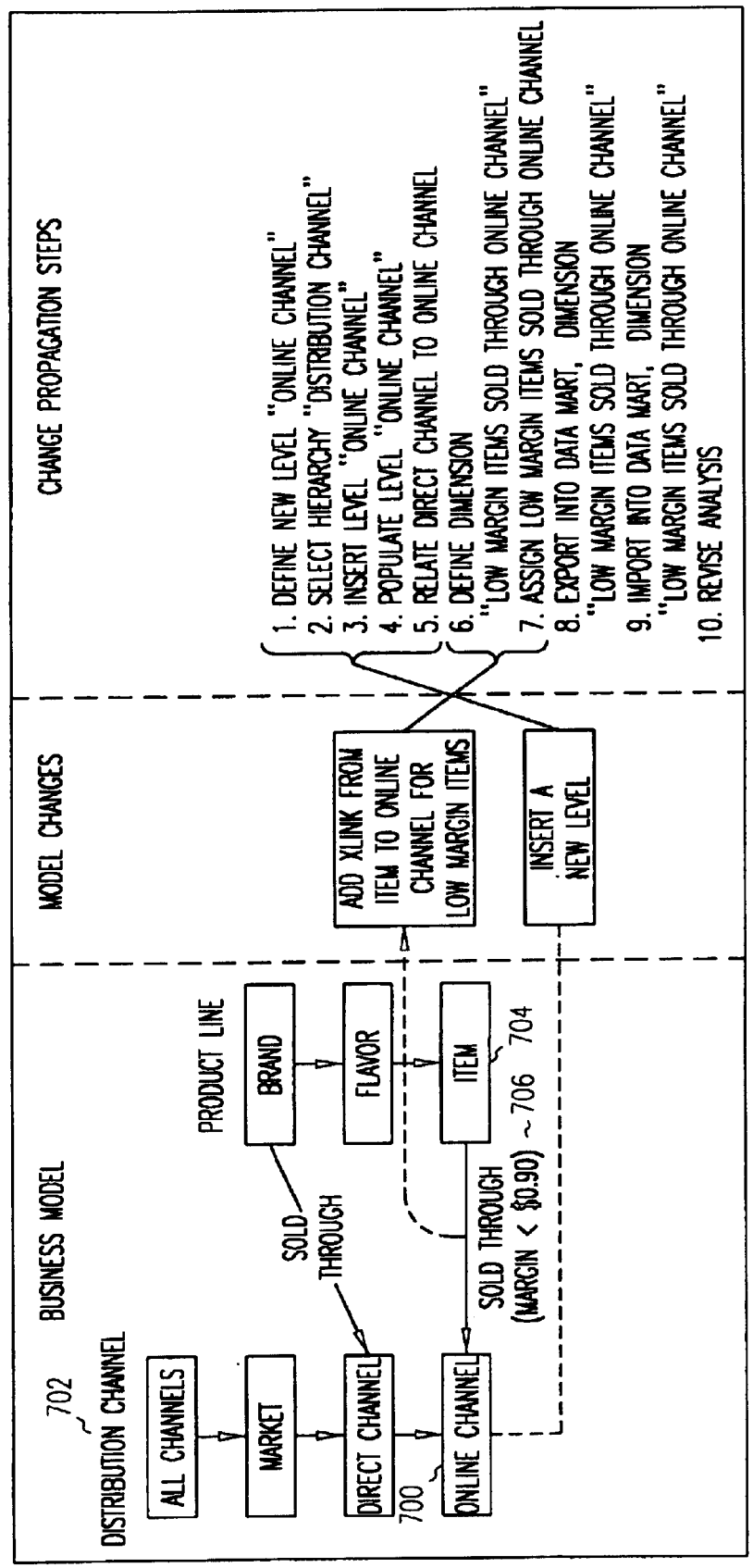
FIG. 7 illustrates a fragment of a hierarchy and a process according to one aspect of the present invention.

Based on these decisions, following changes are implemented to the business data model, as illustrated in FIG. 7:

a) Modify Hierarchies. A new level for "Online Channel" 700 is inserted below Channel Type in the Distribution Channels hierarchy 702.

b) Modify Dimensions. A new dimension is added—Item 704 (in Product Line) sells in Online Channel (in Distribution Channels). The Xlink 706 for this dimension contains a business rule Margin <$0.90.

c) Export to the viewer. The revised business model is exported for review and validation to the viewer.

d) Export to Data Warehouse. Hierarchies, Dimensions and Business Perspectives are exported to the existing data warehouse where the revised business model is applied to existing Facts. This makes the integrity of the business analytics in the data warehouse consistent with the new business reality, while maintaining a version of the old business reality.

e) Export configuration to a corporate portal such that product items and online channel are reflected under the sales section of the portal.

f) Export the product item and online channel information to the corporate CRM system, such as Clarify. This allows the CRM package to track online customer behavior and design campaigns for eBusiness accordingly.

New Business Need C: Mergers & Acquisitions Initiative

The launch of online store at Nature's Best Cookies results in a sudden rise in its stock price. Additionally, it removes inertia from the low margin item sales and adds to the bottom line. Two consecutive quarters of improving bottom line combined with a successful online strategy catapults the stock price five-fold. With improvement in its valuation of such magnitude, Nature's Best Cookies Board decides to explore acquisition targets to grow the business.

In the acquisition hunting process, the VP of Marketing comes across an interesting market study conducted in the last quarter. While Nature's Best Cookies sells pre-baked and packaged cookies of multiple flavors, 30% of the cookies consumed in the customer base are home-baked from packaged dough. Also, the study indicates that the cost of dough eats up more than 40% margin from the sale of baked cookies. Nature's Best Cookies buys about 80% of dough from a single supplier—DoughMakers, Inc. This supplier is a public company with a severely depressed stock price.

The Board at Nature's Best Cookies decides to acquire DoughMakers. While the deal is consummated, the management faces the challenge of integrating the corporate structures and product lines of the two companies. It is decided that DoughMakers products will be sold through existing channels for Nature's Best Cookies. However, the sales team at DoughMakers will be integrated with the sales team at Nature's Best Cookies. The following changes are implemented. Vice President of Sales at Nature's Best Cookies is promoted to Senior Vice President, Worldwide Sales 800. Vice President of Sales at DoughMakers is made Vice President of Sales 802 at Nature's Best Cookies, reporting to the Senior Vice President of Sales. The Regional Directors of Sales at DoughMakers are let go while their sales teams are moved under existing Sales Directors at Nature's Best Cookies. All DoughMakers products are integrated under Nature's Best Cookies Brand and Flavors.

Figure 8:
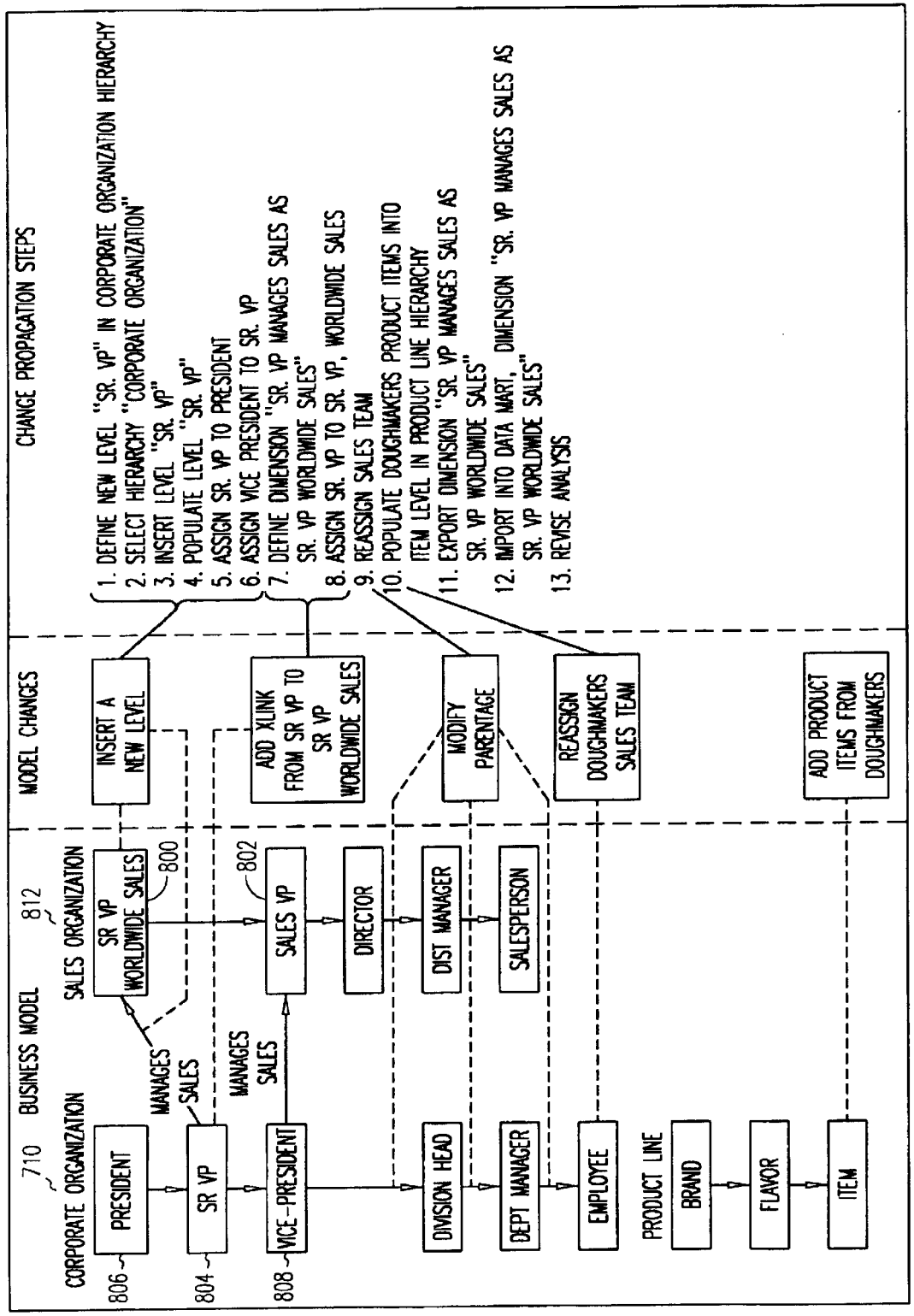
FIG. 8 illustrates a fragment of a hierarchy and a process according to one aspect of the present invention.

Once the acquisition is complete, following changes are implemented in the business model, as illustrated in FIG. 8:

a) Modify Hierarchies. DoughMakers salespeople are moved around; DoughMakers products are reassigned; a new level for "Senior Vice President" 804 is inserted between President 806 and Vice President 808 in the Corporate Organization hierarchy 810; a new level of "Senior Vice President, Worldwide Sales" 800 is inserted above Sales VP 802 in the Sales Organization hierarchy 812.

b) Modify Dimensions. A new dimension is added—Senior Vice President (in Corporate Organization) manages sales as Senior Vice President, Worldwide Sales (in Sales Organization).

c) Export to the viewer. The revised business model is exported for review and validation to the viewer.

d) Export to Data Warehouse. Hierarchies, Dimensions and Business Perspectives are exported to the existing data warehouse where the revised business model is applied to existing Facts. This makes the integrity of the business analytics in the data warehouse consistent with the new business reality, while maintaining a version of the old business reality.

e) Export configuration to a corporate portal such that DoughMakers'organization and product line is reflected f) Export DoughMakers' back office databases of products, employees, chart of accounts etc. to the ERP system at Nature's Best Cookies g) Export the DoughMakers' customer information to the corporate CRM system, such as Clarify. This allows the CRM package to bring DoughMakers' customers into the fold for any future CRM initiatives Conclusion The present invention provides a system, including methods, data structures, apparatus and software for modeling a business and for maintaining a corporate memory of changes due to redeployment of resources, such as corporate reorganization, product category re-definition, marketing promotion rollouts, mergers and acquisitions and spin-offs. By maintaining such an audit trail, the system can automatically synchronize changes in the business with business rules embedded in the information supply chain. Such synchronization can be done very fast and cost-effectively, thereby eliminating the integrity-gap between the current view of information and the historical views.

Although specific embodiments have been illustrated and described herein, it will be appreciated by those of ordinary skill in the art that any arrangement which is calculated to achieve the same purpose may be substituted for the specific embodiment shown. This application is intended to cover any adaptions or variations of the present invention. Therefore, it is manifestly intended that this invention be limited only by the claims and equivalents thereof.

What is claimed is:

1. A data storage medium encoded with a data structure for modeling a business, wherein the data structure is to be accessed by software operative on a computing platform, wherein the da structure comprises:

a hierarchy having name and including two or more levels and a lineage relationship between the levels in the hierarchy, wherein the hierarchy has tree-like structure based on a one-to-many relationship;

each level having one or more members and each member contains identical types of data;

one or more cross-link relationships between levels of two hierarchies, wherein each cross-link relationship defines a business rule or a business constraint, wherein the software is to navigate the levels;

one or more dimensions formed by two hierarchies and a cross-link relationship between the hierarchies, wherein the cross-link represents a many-to-many relationship;

one or more lists wherein the members of a list have the same properties, and further wherein the members of the list may be ordered and applied as members in hierarchies; and one or more business perspectives wherein each business perspective is a collection of two or more dimensions, and further wherein the business perspective is a template of a multidimensional query.

2. The data storage medium according to claim 1, further including one or more additional models to form a business execution and analysis model (BEAM) wherein each BEAM is a collection of one or more hierarchies and/or dimensions used to express a collection of business scenarios or subject areas.

3. The data storage medium according to claim 2, further including one or more additional BEAMs forming a constellation, wherein a constellation is used to express a collection of business scenario or subject areas.

4. The data storage medium according to claim 1, further wherein a relationship is selected from a group consisting of: an association, a business rule, a dependency, or a link between two members at different levels in the same hierarchy, wherein relationships include link rules defining single parent, multiple parents, and orphans.

5. The data storage medium according to claim 1, further wherein a relationship value is a property of the relationship that describes a business rule or business constraint, wherein the value may be expressed as a percentage, a constant or a formula.

6. A software system comprising:

member object software means for defining a plurality of members in a hierarchy of a business enterprise, wherein the members are at least one of the following: data objects, person list objects, team list objects, role list objects, role/person objects, role/team objects, or custom list objects;

lineage software means for defining a lineage relationship between members at different levels in the hierarchy, the relationship between members in the hierarchy defined using one or more relationship business rules;

relationship type software means for defining a business relationship between a first member in a first hierarchy and a second member in a second hierarchy via a cross-link relationship between the first and second hierarchies represented in a many-to-many relationship, the business relationship defined by general rules and optionally exceptions to the general rules; and relationship value software means for defining a relationship between members according to one or more relationship values business rules, wherein the member object software means, the lineage software means, the relationship type software means, and the relationship value software means are encoded in a data storage medium and are operative on a computing platform when read and executed to create the hierarchy, the first hierarchy, and the second hierarchy encoded in the data storage medium.

7. The system according to claim 6, further including software means for navigating between dimensions using the business relationship rules.

8. The system according to claim 6, further wherein the dimensions defined include at least one of the following: organization by product, organization by territory, products by territory, or territory by organization.

9. The system according to claim 6, further including software means for viewing relationships between dimensions graphically using the defined relationships.

10. The system according to claim 6, further including software means for performing a roll up or drill down using data in a member object using the relationships defined between dimensions.

11. The system according to claim 6, further including software means for at least one of the following:

- linking a member to a parent with a relationship value;
- moving and linking member to member at same level as current parent;
- moving and linking a member to skip a level;
- linking a member to multiple parents with relationship value;
- combining members at the same level;
- splitting members and creating new members at the same and different levels;
- inserting or removing a level;
- keeping a history of changes—attribute versioning; and
- managing orphans.

12. A computerized method of modeling a business, comprising:

- defining plurality of members in a dimension, wherein the members are one or more of the following: data objects, person list objects, team list objects, role list objects, role/person objects, role/team objects, or custom list objects;
- defining a lineage relationship between members in a hierarchy to provide a hierarchy of members at different levels in the hierarchy, the relationship between members in the hierarchy defined using one or more parentage business rules;
- defining a business relationship between a first member in a first hierarchy and a second member in a second hierarchy via a cross-link relationship between the first and second hierarchies represented in a many-to-many relationship, the business relationship defined by general rules and optionally exceptions to the general rules, wherein the first hierarchy and the second hierarchy are encoded in a data storage medium; and
- defining a financial relationship between members according to one or more relationship values business rules.

13. A data storage medium encoded with a data structure and software, wherein the data structure is to be accessed by the software operative on a computing platform, wherein the data structure comprises:

- data defining a plurality of members in a hierarchy, wherein the members are at least one of the following: data objects, person list objects, team list objects, role list objects, role/person objects, role/team objects, or custom list objects;
- data defining a lineage relationship between members in a hierarchy to provide a hierarchy of members at different levels in the hierarchy, the relationship between members in the hierarchy defined using one or more parentage business rules;
- data defining a business relationship between a first member in a first hierarchy and a second member in a second hierarchy via a cross-link relationship between the first and second hierarchies represented in a many-to-many relationship, the business relationship defined by general rules and optionally exceptions to the general rules, wherein the software is to create the data defining the business relationship; and
- data defining a financial relationship between members according to one or more relationship values business rules.

\* \* \* \* \*

UNITED STATES PATENT AND TRADEMARK OFFICE
CERTIFICATE OF CORRECTION

PATENT NO. : 6,947,951 B1
DATED : September 20, 2005
INVENTOR(S) : Gill

It is certified that error appears in the above-identified patent and that said Letters Patent is hereby corrected as shown below:

Column 12,
Line 2, delete "da" and insert -- data --.
Line 3, after "having" insert -- a --.

Signed and Sealed this

Seventeenth Day of January, 2006

JON W. DUDAS
*Director of the United States Patent and Trademark Office*